(12) United States Patent
Simileysky

(10) Patent No.: US 12,395,822 B2
(45) Date of Patent: *Aug. 19, 2025

(54) TIME OF ARRIVAL ESTIMATION FOR BLUETOOTH SYSTEMS AND DEVICES

(71) Applicant: Cypress Semiconductor Corporation, San Jose, CA (US)

(72) Inventor: Victor Simileysky, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 17/959,629

(22) Filed: Oct. 4, 2022

(65) Prior Publication Data

US 2023/0094598 A1 Mar. 30, 2023

Related U.S. Application Data

(63) Continuation of application No. 16/022,489, filed on Jun. 28, 2018, now Pat. No. 11,483,691.

(Continued)

(51) Int. Cl.
| | |
|---|---|
| *H04W 4/80* | (2018.01) |
| *G01S 11/08* | (2006.01) |
| *H04B 17/318* | (2015.01) |
| *H04L 43/022* | (2022.01) |
| *H04L 43/106* | (2022.01) |
| *H04L 69/22* | (2022.01) |
| *H04W 28/02* | (2009.01) |

(Continued)

(52) U.S. Cl.
CPC ............ *H04W 4/80* (2018.02); *H04B 17/318* (2015.01); *H04L 43/022* (2013.01); *H04L 43/106* (2013.01); *H04L 69/22* (2013.01); *H04W 28/021* (2013.01); *H04W 40/244* (2013.01); *G01S 11/08* (2013.01); *H04W 84/18* (2013.01)

(58) Field of Classification Search
CPC .... H04B 17/318; H04W 4/80; H04W 40/244; H04W 28/021; H04W 84/18; H04L 69/22; H04L 47/28
See application file for complete search history.

(56) References Cited

U.S. PATENT DOCUMENTS 6,510,186 B1 1/2003 Chen et al.
2016/0234706 A1* 8/2016 Liu .................... H04L 27/2662

OTHER PUBLICATIONS

Chinese Office Action from Application 201980019231.8 dated Sep. 11, 2023; 11 pages.

* cited by examiner

*Primary Examiner* — Noel R Beharry
*Assistant Examiner* — Rodrick Mak

(57) ABSTRACT

Disclosed herein are systems, methods, and devices for time of arrival estimation. Devices include a packet detector configured to identify a data packet included in a received signal having a symbol frequency, and a time stamping unit configured to generate an initial time stamp. Devices also include one or more processors configured to identify an estimated timing of a symbol boundary based on a time of a change in phase of the received signal estimated by using a phase rotation speed and a sample time of an IQ sample of a plurality of IQ samples to compute the time of the change in phase. The one or more processors are also configured to generate an estimated time of arrival based on the initial time stamp, the plurality of IQ samples, and the identified timing of the symbol boundary, wherein the estimated time of arrival is a corrected time of arrival.

20 Claims, 5 Drawing Sheets

Related U.S. Application Data

(60) Provisional application No. 62/642,307, filed on Mar. 13, 2018, provisional application No. 62/642,445, filed on Mar. 13, 2018.

(51) Int. Cl.
*H04W 40/24* (2009.01)
*H04W 84/18* (2009.01)

TIME OF ARRIVAL ESTIMATION FOR BLUETOOTH SYSTEMS AND DEVICES

CROSS-REFERENCE TO RELATED APPLICATIONS

This application is a Continuation of U.S. patent application Ser. No. 16/022,489, filed Jun. 28, 2018, now U.S. Pat. No. 11,483,691 issued on Oct. 25, 2022, which claims the benefit under 35 U.S.C. § 119 (e) of U.S. Provisional Patent Application No. 62/642,445, filed on Mar. 13, 2018, and U.S. Provisional Patent Application No. 62/642,307, filed on Mar. 13, 2018, which are incorporated by reference herein in their entirety for all purposes.

TECHNICAL FIELD

This disclosure generally relates to time of arrival estimation and, more specifically, to time of arrival estimation with wireless devices.

BACKGROUND

Hardware devices may include tracking devices and tracked devices. Such hardware devices are configured to communicate with each other wirelessly using various wireless communications and transmission techniques. For example, hardware devices may include transmitters and receivers that may utilize wireless antennas or radios to transmit and receive messages. Examples of such devices may include beacons that broadcast messages to nearby devices such as tags. Pairings between such beacons and tags may be used to implement various functionalities, such as triggering a location-based action.

DETAILED DESCRIPTION

Figure 1:
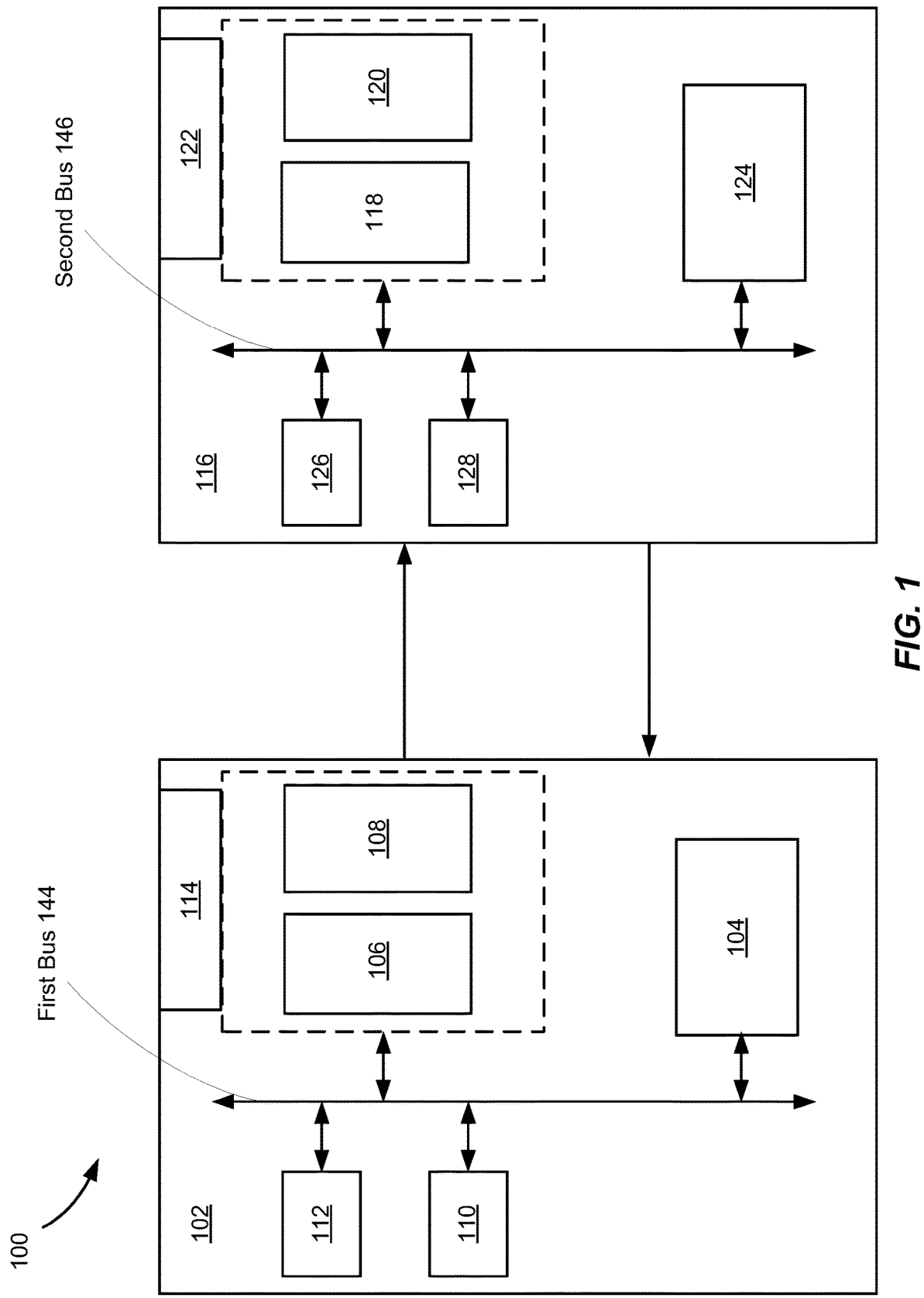
FIG. 1 illustrates an example of a system for time of arrival estimation, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As discussed above, hardware devices may be configured to communicate with each other wirelessly. Moreover, such wireless communications modalities may include the implementation of Bluetooth and Bluetooth Low Energy radios. In such implementations, data may be encoded and represented as symbols, or data values, and sent using Gaussian Frequency Shift Keying (GFSK) modulation in which a modulation around a particular carrier frequency may be used to encode and decode data values. Such Bluetooth and Bluetooth Low Energy radios may be implemented in the contexts of a variety of devices. One example includes tracking devices and tracked devices that are configured to communicate with each other wirelessly. Such tracking and tracked devices may be beacons that broadcast messages to nearby devices such as tags. Pairings between such beacons and tags may be used to implement various functionalities and/or operations, such as access to secure locations or areas. In a specific example, a beacon may be located in a user's car, and a tag may be incorporated in a user's key fob. Accordingly, the beacon may be configured to unlock the user's car when the beacon is detected within a certain proximity As will be discussed in greater detail below, Bluetooth modalities may utilize carrier frequencies that are relatively low for the purposes of time of flight and distance computations. Accordingly, the low clock frequency of many Bluetooth devices results in an imprecision of the determination of arrival times, and an imprecision of determinations of times of flight and distances determined based on such determined arrival times. For example, traditional techniques utilizing typical clock frequencies of Bluetooth devices may have temporal resolutions in the microsecond range that result in the determination of distances between Bluetooth beacons and tags with an ambiguity of greater than 1000 ft. Such a lack of precision in the determination of distances between such beacons and tags is not able to provide sufficient authentication for various applications, such as the authentication and access to a user's car described above. Accordingly, such beacons are susceptible to being fooled by other tags or devices which may have spoofed identities or imitated identification information. Returning to a previous example, another entity may have managed to obtain or replicate the identifier of the tag, and may attempt to use such replicated information to obtain access to the user's car.

Various systems, devices, and methods disclosed herein provide accurate identification of arrival times associated with wireless communications devices to enable an accurate determination of a distance between the communications devices. As will be discussed in greater detail below, embodiments disclosed herein are configured to identify symbol boundaries with a temporal resolution exceeding the symbol, and obtaining sampling rates that bring the granularity and resolution into the nanosecond range. For example, phase and magnitude data may be acquired at sampling rate with a signal-to-noise ratio (SNR) exceeding a sampling rate resolution. Accordingly, a phase value of each sample is distinguishable from it's neighboring samples. Such phase and magnitude data may be used to identify a symbol boundary, which may be associated with the reception of the data packet, and such a boundary may be identified with a sub-sample resolution.

In this way, the resolution and accuracy of the determination of the time of arrival of a data packet is greatly improved, and a subsequent determination of a distance is greatly improved. Accordingly, the accuracy of the determination of a distance between devices, such as a beacon and a tag is greatly improved, and in a manner that is compatible with the use of Bluetooth devices, and also Bluetooth Low Energy devices.

FIG. 1 illustrates an example of a system for time of arrival estimation, configured in accordance with some embodiments. As will be discussed in greater detail below, systems and devices disclosed herein are configured to implement accurate time of arrival estimation for tracked devices and tracking devices. In one example, a tracking device may be a beacon, and a tracked device may be a tag. Accordingly, systems and devices disclosed herein enable accurate time of arrival estimation in contexts where devices may be under power consumption constraints, where such devices may also be under transmission frequency constraints, and where there may be variance between clocks of the tracking and tracked devices.

In various embodiments, system 100 includes tracking device 102. As similarly discussed above, tracking device 102 may be a low energy device such as a beacon. In various embodiments, tracking device 102 includes various communications components configured to implement a communications interface capable of wireless transmission. For example, tracking device 102 may include first receive radio 106 that is configured to generate a signal to be transmitted from tracking device 102. Tracking device 102 may further include first transmit radio 108 which is configured to receive a signal that is transmitted from another device. In various embodiments, such signals may be wireless signals. In one example, such signals may be transmitted and received in a particular frequency range, as may be the case when first receive radio 106 and first transmit radio 108 are implemented as part of a Bluetooth radio. Tracking device 102 may further include first antenna 114 that is configured to transmit and receive the signals first receive radio 106 and first transmit radio 108.

In various embodiments, tracking device 102 also includes first TOA estimator 104 which is configured to generate an accurate identification of an arrival time of a signal, or a portion of a signal, at tracking device 102. Accordingly, first TOA estimator 104 is configured to identify an arrival time of a portion of a received signal with a resolution that exceeds arrival time estimation based on symbol detection alone. As will be discussed in greater detail below with reference to FIGS. 2-5, first TOA estimator 104 is configured to generate a time stamp at packet detection, and is further configured to start the capture of in-phase and quadrature (IQ) samples. As used herein, IQ may be in-phase and quadrature components of signals. First TOA estimator 104 is further configured to determine an offset based on the captured IQ samples that may be stored in a buffer. In various embodiments, the packet detection may be associated with a sync event, and the determined offset may be a sync event offset. As will be discussed in greater detail below, a sync event may be a predetermined identifier that may be determined based on a configuration operation, or a transmission protocol. For example, a sync event may be a 1-bit symbol at a particular location in a data packet. In various embodiments, a symbol may be a transmission data unit that may be determined based on a transmission protocol. First TOA estimator 104 is further configured to correct the initial time stamp based on the offset to generate an estimated time of arrival that represents a time of arrival value that has been corrected to compensate for characteristics of low carrier frequencies and variances between clocks.

Tracking device 102 may additionally include first processor 110 and first memory 112. Accordingly, first processor 110 may be configured to implement various processing operations disclosed herein, and first memory 112 may be configured to store data associated with such operations, as well as store data associated with transmitted and received signals. Moreover, components of tracking device 102 may be communicatively coupled to each other via first bus 144.

System 100 also includes tracked device 116. As similarly discussed above, tracked device 116 may be a low energy device such as a tag. In various embodiments, tracked device 116 includes various communications components configured to implement a communications interface capable of wireless transmission. For example, tracked device 116 may include second receive radio 118 that is configured to generate a signal to be transmitted from tracked device 116. Tracked device 116 may further include second transmit radio 120 which is configured to receive a signal that is transmitted from another device, such as tracking device 102. As discussed above, such signals may be wireless signals, as may be the case when second receive radio 118 and second transmit radio 120 are implemented as part of a Bluetooth radio. Tracked device 116 may further include second antenna 122 that is configured to transmit and receive the signals second receive radio 118 and second transmit radio 120.

In various embodiments, tracked device 116 also includes second TOA estimator 124 which is configured to generate an accurate identification of an arrival time of a signal, or a portion of a signal, at tracked device 116. As similarly discussed above, second TOA estimator 124 is configured to generate a time stamp at packet detection, and is further configured to start the capture of IQ samples. Second TOA estimator 124 is further configured to determine an offset based on the captured IQ samples, and correct the initial time stamp based on the offset to generate an estimated time of arrival that represents a time of arrival value that has been corrected to compensate for characteristics of low carrier frequencies and variances between clocks. In various embodiments, second TOA estimator 124 is optionally included in tracked device 116. Accordingly, in some embodiments, tracked device 116 does not include second TOA estimator 124.

As similarly discussed above, tracked device 116 may additionally include second processor 126 and second memory 128. Accordingly, second processor 126 may be configured to implement various processing operations disclosed herein, and second memory 128 may be configured to store data associated with such operations, as well as store data associated with transmitted and received signals. Moreover, components of tracked device 116 may be communicatively coupled to each other via second bus 146.

Figure 2:
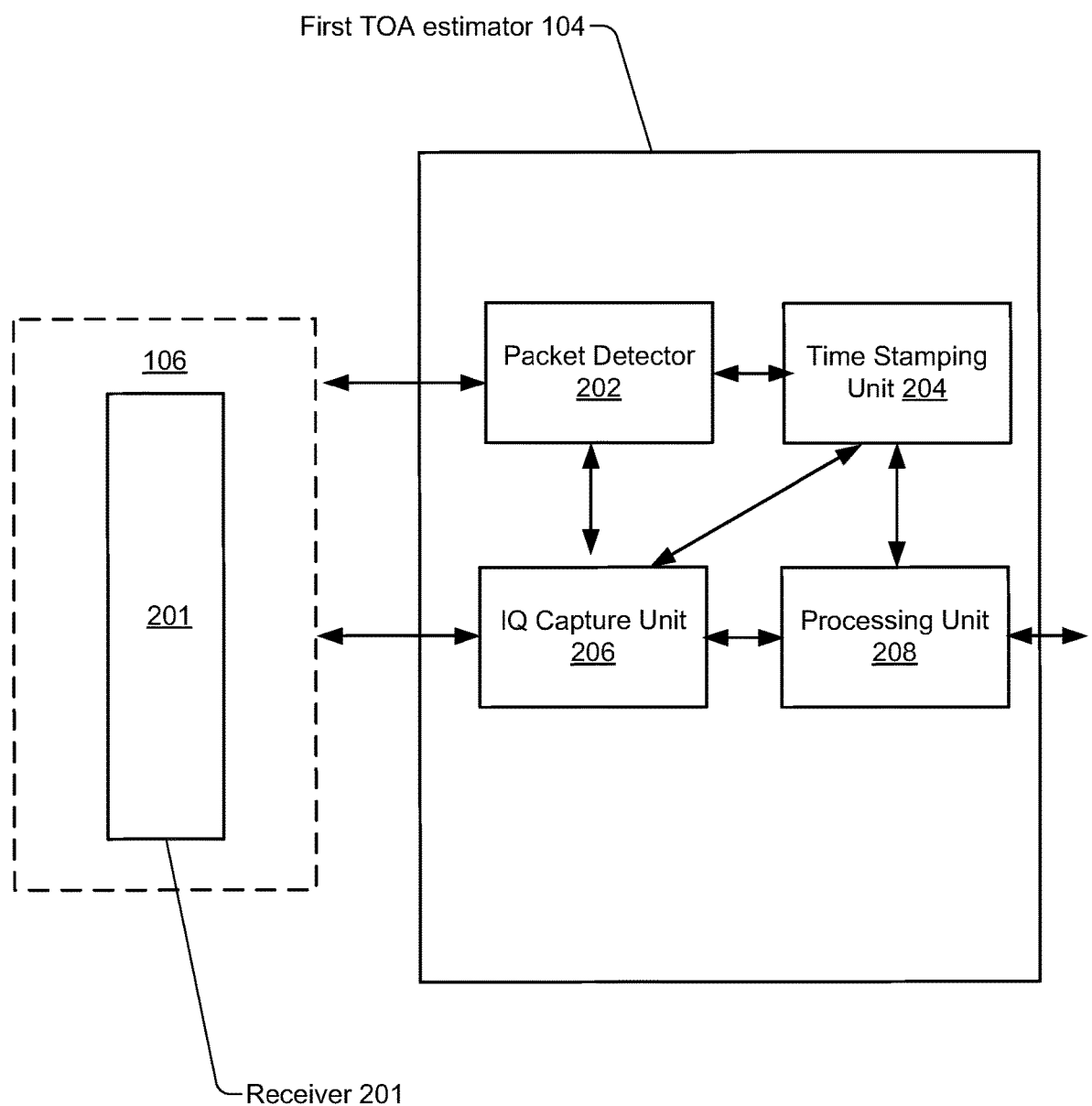
FIG. 2 illustrates an example of a time of arrival (TOA) estimator, configured in accordance with some embodiments.

FIG. 2 illustrates an example of a TOA estimator, configured in accordance with some embodiments. As discussed above, a TOA estimator as disclosed herein is configured to enable determination of an arrival time of a received signal, or a portion of a signal such as a packet, at a resolution that exceeds that of typical packet-based estimation techniques. In some embodiments, a TOA estimator, such as first TOA estimator 104, may include various components to implement such high resolution TOA estimation.

For example, first TOA estimator 104 includes packet detector 202 which is configured to identify the arrival of a data packet. For example, packet detector 202 may be configured to detect and identify a header or a preamble of a data packet, and may be further configured to identify a header of a particular type of data packet, such as that associated with a sync event. As discussed above, the data packet may be a Bluetooth data packet. As shown in FIG. 2, packet detector 202 is configured to be coupled to receiver 201, which may be coupled to or included in first receive radio 106. Accordingly, data values may be received via first receive radio and receiver 201, and a packet may be identified by packet detector 202 based on the received data.

First TOA estimator 104 also includes time stamping unit 204 which is configured to generate time stamps based on an available clock. In various embodiments, time stamping unit 204 is configured to generate a time stamp in response to packet detector 202 identifying an arrival of a packet. More specifically, packet detector 202 may identify a header of a data packet, and time stamping unit 204 may generate an initial time stamp responsive to packet detector 202 detecting a packet. The generated time stamp may be stored in a memory implemented within first TOA estimator 104, or may be stored in a memory such as first memory 112.

In various embodiments, first TOA estimator 104 also includes IQ capture unit 206 which is configured to capture IQ data associated with the data received via first receive radio and receiver 201. As shown in FIG. 2, IQ capture unit 206 is configured to be coupled to receiver 201 as well as packet detector 202 and time stamping unit 204. Accordingly, IQ capture unit 206 is configured to begin acquiring samples in response to packet detector 202 detecting a packet, as may be the case when a data packet preamble is detected. In various embodiments, the captured IQ data includes data representing magnitude and phase features and measurements of the received signal. Accordingly, once triggered, IQ capture unit is configured to acquire IQ samples of the received data, and store the IQ samples in a storage device included in IQ capture unit 206. In some embodiments, the sample rate of the IQ samples is faster than the modulation and/or symbol frequency of the received signal. Accordingly, in such embodiments, the IQ samples are acquired with a higher temporal resolution than the underlying signal. In other embodiments, the sample rate may be the same as the modulation and/or symbol frequency of the received signal. In various embodiments, the storage device may be a buffer having a designated and configurable size.

First TOA estimator 104 also includes processing unit 208 which includes a processor configured to generate an estimated TOA. As discussed above, Gaussian Frequency Shift Keying (GFSK) modulation is used for various wireless communication techniques. For example, GFSK modulation may be used for Bluetooth and BLE communication. Accordingly, each symbol is encoded with a +f or −f frequency offset, where f is an offset from the central carrier frequency. Moreover, frequency transitions may be smoothed by the application of a Gaussian filter. Thus, according to some embodiments, by observing the phase of the incoming signal, a true symbol boundary, which may be the point at which a phase of the received signal changes, may be estimated, and not limited by a clock rate or frequency of operation of the associated transmitter and receiver.

Accordingly, processing unit 208 is configured to map the acquired IQ sampled data to symbols based on a known relationship between the symbols and their associated IQ characteristics. For example, for a sync event, the underlying data values of the sync event may be predetermined and known to tracking device 102 and first TOA estimator 124 as part of an initial configuration operation, or as determined by a transmission protocol. Accordingly, processing unit 208 may be configured to utilize GFSK demodulation to identify symbol values based on demodulation of the IQ samples. In this way, the phase values included in the IQ sampled data may be mapped to symbol values based on a predetermined GFSK demodulation. The identified symbol values may be matched and/or parsed, as discussed in greater detail below.

Processing unit 208 is further configured to identify a particular portion of the received signal based on the mapping. For example, processing unit 208 is configured to identify a particular symbol, such as a symbol corresponding to a sync event, and may further identify a time associated with the symbol with a based on the available IQ samples. More specifically, the IQ samples may be used to identify a sample time corresponding to when the symbol was received, and the sample time may be used in conjunction with a capture start time to generate an offset value. The offset value may be used to adjust the initial time stamp that was generated, thus generating an estimated time of arrival that is a corrected and final time of arrival value. As will be discussed in greater detail below with reference to FIGS. 3-5, the offset value may be a sub-sample offset value.

While above has been discussed above with reference to first TOA estimator 104, it will be appreciated that second TOA estimator 124 may be configured in a similar manner, and may also include a packet detector, IQ capture, time stamping unit, and processing unit as described above.

Furthermore, TOA estimators as disclosed herein may also be configured to implement other calculations as well. For example, first TOA estimator 104 and second TOA estimator 124 may also be configured to determine a time of flight (TOF) or round trip time (RTT) associated with a data packet. In this example, an initial signal may have been sent from tracking device 102 to tracked device 116, and a reply signal may have been sent from tracked device 116 to tracking device 102 in response to receiving the initial signal. The TOF may be calculated based on equation 1 provided below:

$$RTT=(ToA1-ToD1)-(ToD2-ToA2) \quad (1)$$

Using this equation as applied to the example discussed above, ToD1 may be a time of departure of the initial signal from tracking device 102, ToA2 may be a time of arrival at tracked device 116, ToD2 may be a departure time of the reply message from tracked device 116, and ToA1 may be an arrival time of the reply message at tracking device 102. The times may be included in the signals/messages as timestamps for subsequent computations. As discussed above, the TOAs utilized in this computation may be estimated TOAs that have been corrected by TOA estimators.

Figure 3:
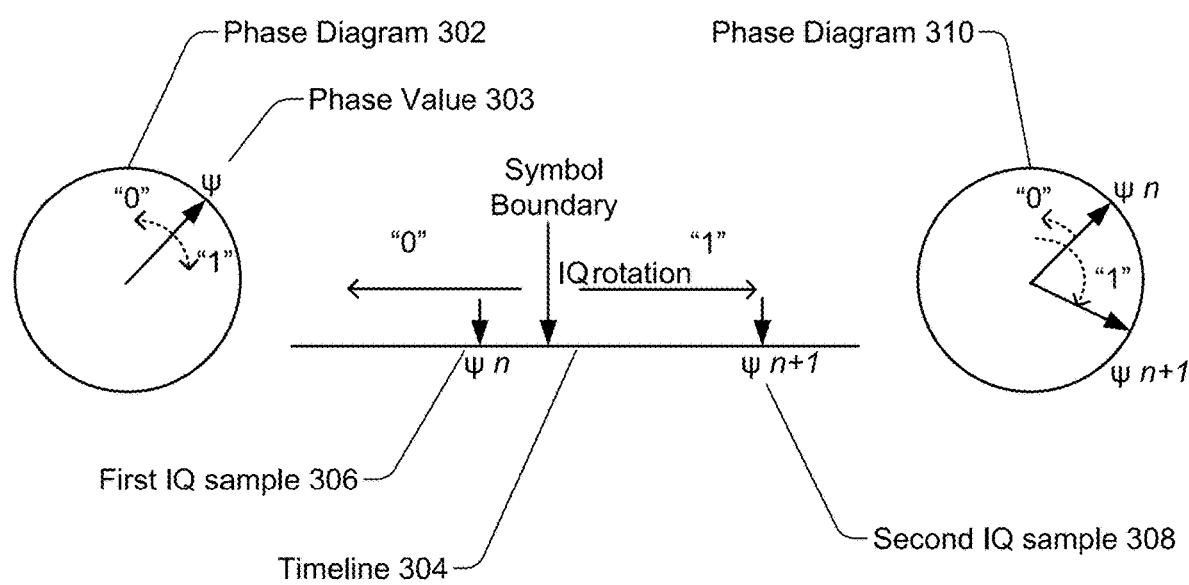
FIG. 3 illustrates an example of an illustration of a relationship between a phase rotation and a symbol boundary, implemented in accordance with some embodiments.

FIG. 3 illustrates an example of an illustration of a relationship between a phase rotation and a symbol boundary, implemented in accordance with some embodiments. As discussed above, transmission of data values may utilize GFSK modulation in which data is encoded by modulation of a frequency of transmission around a central carrier frequency, and modulation of a direction of a phase of the transmitted signal. As shown in FIG. 3, phase diagram 302 illustrates how a directionality of a phase may be indicative of a data value of "1" or "0", and phase diagram 302 further illustrates how a particular phase value, such as phase value 303, may correspond to a transition between data values, and a particular point in a data pattern of a signal, such as a beginning of a symbol.

For example, timeline 304 illustrates a timeline of a phase rotation from a data value of "0" to "1". In this example, the boundary between the "0" to "1" is the symbol boundary. Moreover, first IQ sample 306 and second IQ sample 308 are also illustrated as being sampled at a first time and a second time. Such first IQ sample 306 and second IQ sample 308 and their associated times are represented in phase diagram 310. Accordingly, FIG. 3 illustrates how acquired IQ samples provide phase information that is used in conjunction with a known phase rotation characteristic or behavior of a transmitter and signal to enable the identification of data value transitions and symbol boundaries with a sub-symbol resolution.

Figure 4:
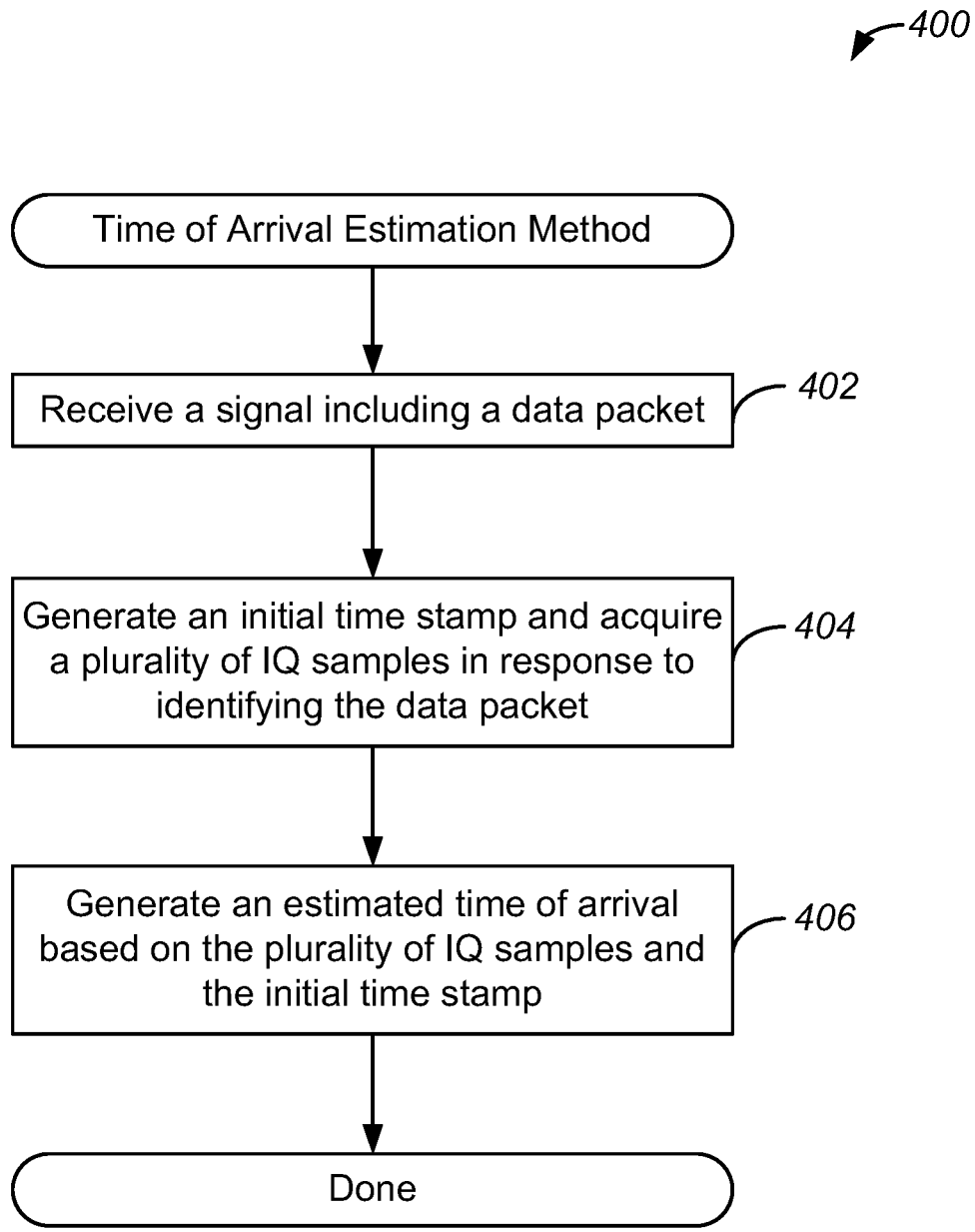
FIG. 4 illustrates a method for time of arrival estimation, configured in accordance with some embodiments.

FIG. 4 illustrates a method for time of arrival estimation, configured in accordance with some embodiments. Accordingly, methods disclosed herein provide accurate time of arrival estimation in contexts where devices may be under power consumption constraints, where such devices may also be under transmission frequency constraints, and where there may be variance between clocks of the tracking and tracked devices.

Accordingly, method 400 may commence with operation 402 during which a signal including a data packet is received. As discussed above, the signal may include data packets which may include headers that are identified based on particular symbols. Accordingly, a data packet may be received, and an initial time stamp may be generated in response to the receiving.

Method 400 may proceed to operation 404 during which IQ samples are acquired. Accordingly, in response to the header being detected and the initial time stamp being generated, IQ samples may be acquired. As discussed above, the IQ samples are acquired at sampling rate with a signal-to-noise ratio (SNR) exceeding a sampling rate resolution. The IQ samples include phase and magnitude information of the received signal, and such samples are stored in a buffer.

Method 400 may proceed to operation 406 during which an estimated time of arrival is determined based on the IQ samples and the initial time stamp. Accordingly, the acquired IQ samples may be mapped to their appropriate symbols, and a beginning of a particular portion of the received signal may be identified. For example, the beginning of a symbol corresponding to a sync event may be identified. Once identified, an offset value may be calculated, and used to adjust the initial time stamp to generate the estimated time of arrival.

Figure 5:
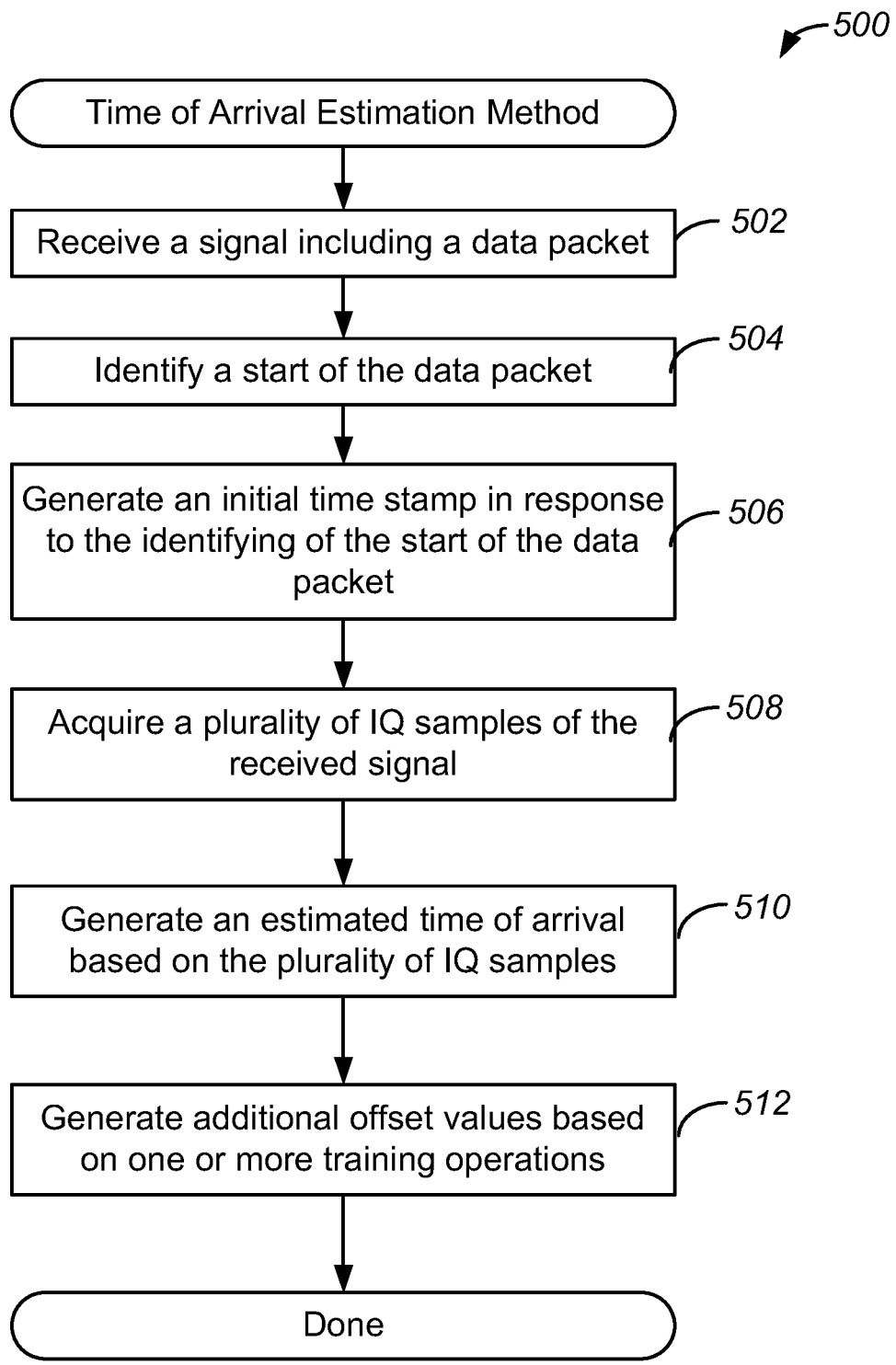
FIG. 5 illustrates another method for time of arrival estimation, configured in accordance with some embodiments.

FIG. 5 illustrates another method for time of arrival estimation, configured in accordance with some embodiments. As similarly discussed above, methods disclosed herein provide accurate time of arrival estimation in a variety of contexts and subject to a variety of operational constraints. Moreover, embodiments disclosed herein may be configured to implement one or more training operations to compensate for operational characteristics in device and system components such as clocks and oscillators.

Accordingly, method 500 may commence with operation 502 during which a data packet may be received. As similarly discussed above, the data packet may be received at a receive radio that is configured as a Bluetooth or Bluetooth Low Energy radio. Accordingly, the data packet may be sent using a carrier frequency that has a relatively low clock rate and utilizes GFSK modulation.

Method 500 may proceed to operation 504 during which a packet detector identifies a start of the data packet. Accordingly, as discussed above, packet detector may identify a start of a data packet in response to identifying a particular sequence of symbols that identify the start of a data packet, such as those reserved for a header. Moreover, the packet detector may identify the start of a particular type of data packet, such as that utilized to transmit a sync event.

Method 500 may proceed to operation 506 during which an initial time stamp may be generated. Accordingly, responsive to the detecting of the data packet, an initial time stamp may be generated that identifies a time at which the data packet was received. As discussed above, the initial time stamp may be subject to a relatively low temporal resolution which may be insufficient for various techniques, such as time of flight and distance determination.

Method 500 may proceed to operation 508 during which IQ samples may be acquired. Accordingly, in response to the time stamp being generated, IQ samples may be acquired to obtain phase and magnitude information about the received signal at a high temporal frequency. In various embodiments, the temporal resolution and frequency of the IQ samples is determined based on the clock frequency of the received signal. For example, the IQ sampling frequency may be several times greater than the clock frequency of the received signal.

Method 500 may proceed to operation 510 during which an estimated TOA may be generated. As discussed above, the acquired IQ samples may be mapped to their appropriate symbols using a relationship between symbols and their phase patterns, and such mapping may be implemented via demodulation of the IQ sampled data. A symbol corresponding to the sync event may be identified based on the mapping, and a time of the symbol boundary may be identified based on the IQ sampled data and a known phase rotation characteristic or behavior or the received signal. Accordingly, based on the phase information included in the IQ sampled data, TOA estimator is configured to estimate the precise time at which the phase of the signal changes, and the symbol boundary occurred. This precise time may be stored as offset value that represents an amount of time between the start of the IQ sampling, and the determined symbol boundary. As discussed above, the offset value may be calculated, and used to adjust the initial time stamp to generate the estimated time of arrival. For example, the initial time stamp may be modified by subtracting the offset value to generate an estimated or corrected time of arrival.

Method 500 may proceed to operation 512 during which additional offsets may be implemented based on one or more training operations. For example, the received data may include particular patterns of data values that may be used to compensate for changes in a phase rotation speed and a frequency of transmission that may be included in the signal due to varying characteristics of the transmitter of the signal. In one example, a capture of a comb pattern such as "010" or "101" may be used to identify a change in a modulation index, or rotation speed, of the transmitter based on a variance in the modulation index over the duration of time in which the comb pattern is transmitted. In another example, the capture of a repeating pattern such as "00" or "11" may be used to identify a change or drift in a central carrier frequency over a duration of time. Such identified changes may be used to generate estimates of the behavior of the transmitter over time that may be stored as temporal coefficients, and such estimates may be used to implement additional modifications or corrections to the initial time stamp discussed above.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:
1. A device comprising:
a packet detector configured to identify a data packet included in a received signal having a symbol frequency;

a time stamping unit configured to generate an initial time stamp in response to the packet detector identifying the data packet; and one or more processors configured to:
identify an estimated timing of a symbol boundary based on a time of a change in phase of the received signal estimated by using a phase rotation speed and a sample time of an IQ sample of a plurality of IQ samples to compute the time of the change in phase, the estimated timing of the symbol boundary being a time of a data value transition between symbols, the phase rotation speed being identified by phase features of the received signal, and based on a modulation encoding scheme of the received signal; and
generate an estimated time of arrival based on the initial time stamp, the plurality of IQ samples, and the identified timing of the symbol boundary, wherein the estimated time of arrival is a corrected time of arrival.

2. The device of claim 1, wherein the one or more processors are further configured to:
generate a mapping between the plurality of IQ samples and a plurality of symbols;
identify the symbol boundary based, at least in part, on the mapping; and
generate the estimated time of arrival based on the symbol boundary.

3. The device of claim 2, wherein the estimated time of arrival is a corrected time stamp.

4. The device of claim 1, wherein the plurality of IQ samples is stored in a buffer.

5. The device of claim 1, wherein a sampling rate of the plurality of IQ samples unit is greater than the symbol frequency of the received signal.

6. The device of claim 1, wherein the data packet is a header associated with a sync event.

7. The device of claim 1, wherein the packet detector is a Bluetooth packet detector configured to identify Bluetooth data packets.

8. The device of claim 1, wherein the one or more processors are further configured to generate additional offsets to compensate for modulation index and carrier frequency drift.

9. A system comprising:
a receive radio configured to receive a wirelessly transmitted signal via an antenna, the signal having a symbol frequency; and
a time of arrival estimator comprising:
a packet detector configured to identify a data packet included in the received signal;
a time stamping unit configured to generate an initial time stamp in response to the packet detector identifying the data packet; and
one or more processors configured to:
identify an estimated timing of a symbol boundary based on a time of a change in phase of the received signal estimated by using a phase rotation speed and a sample time of an IQ sample of a plurality of IQ samples to compute the time of the change in phase, the estimated timing of the symbol boundary being a time of a data value transition between symbols, the phase rotation speed identified by phase features of the received signal, and based on a modulation encoding scheme of the received signal; and
generate an estimated time of arrival based on the initial time stamp, the plurality of IQ samples, and the identified timing of the symbol boundary, wherein the estimated time of arrival is a corrected time of arrival.

10. The system of claim 9 wherein the one or more processors are further configured to:
generate a mapping between the plurality of IQ samples and a plurality of symbols;
identify the symbol boundary based, at least in part, on the mapping; and
generate the estimated time of arrival based on the symbol boundary.

11. The system of claim 10, wherein the estimated time of arrival is a corrected time stamp.

12. The system of claim 9, wherein a sampling rate is greater than the symbol frequency of the received signal.

13. The system of claim 9, wherein the receive radio and the time of arrival estimator are included in a Bluetooth beacon.

14. The system of claim 13, wherein the receive radio is a Bluetooth radio, and wherein the packet detector is a Bluetooth packet detector configured to identify Bluetooth data packets.

15. A method comprising:
receiving a wirelessly transmitted signal having a symbol frequency;
identifying a data packet included in the received signal, the data packet being a Bluetooth data packet;
generating an initial time stamp in response to the identifying of the data packet;
identify an estimated timing of a symbol boundary based on a time of a change in phase of the received signal estimated by using a phase rotation speed and a sample time of an IQ sample of a plurality of IQ samples to compute the time of the change in phase, the estimated timing of the symbol boundary being a time of a data value transition between symbols, the phase rotation speed identified by phase features of the received signal, and based on a modulation encoding scheme of the received signal; and
generating an estimated time of arrival based on the initial time stamp, the plurality of IQ samples, and the identified timing of the symbol boundary, wherein the estimated time of arrival is a corrected time of arrival.

16. The method of claim 15 further comprising:
generating a mapping between the plurality of IQ samples and a plurality of symbols;
identifying the symbol boundary based, at least in part, on the mapping; and
generating the estimated time of arrival based on the symbol boundary.

17. The method of claim 15, wherein a sampling rate of the plurality of IQ samples is greater than the symbol frequency of the received signal.

18. The method of claim 15, wherein the data packet is a header associated with a Bluetooth sync event.

19. The method of claim 15 further comprising:
storing the plurality of IQ samples in a buffer.

20. The method of claim 15, wherein the signal is received via a Bluetooth radio, and wherein data packet is a Bluetooth data packet.

* * * * *